(12) United States Patent
Sun et al.

(10) Patent No.: US 8,705,986 B2
(45) Date of Patent: Apr. 22, 2014

(54) PMD-INSENSITIVE METHOD OF CHROMATIC DISPERSION ESTIMATION FOR A COHERENT RECEIVER

(75) Inventors: Han Henry Sun, Ottawa (CA); Kuang-Tsan Wu, Kanata (CA)

(73) Assignee: Infinera Corporation, Sunnyvale, CA (US)

(*) Notice: Subject to any disclaimer, the term of this patent is extended or adjusted under 35 U.S.C. 154(b) by 283 days.

(21) Appl. No.: 12/926,533

(22) Filed: Nov. 23, 2010

(65) Prior Publication Data
US 2012/0128376 A1    May 24, 2012

(51) Int. Cl.
*H04B 10/64*    (2013.01)

(52) U.S. Cl.
USPC ............................................. 398/208; 398/204

(58) Field of Classification Search
USPC ................................. 398/204–206, 208–211
See application file for complete search history.

(56) References Cited

U.S. PATENT DOCUMENTS

| | | | |
|---|---|---|---|
| 8,355,637 B2* | 1/2013 | Sano et al. | 398/204 |
| 2009/0214201 A1* | 8/2009 | Oda et al. | 398/25 |
| 2010/0119241 A1* | 5/2010 | Yang et al. | 398/208 |

OTHER PUBLICATIONS

Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.
K. Roberts, et al, "Performance of dual-polarization QPSK for optical transport systems," JLT, vol. 27, No. 16, pp. 3546-3559, Aug. 2009.
S.J. Savory, et al, "Digital equalisation of 40Gbit/s per wavelength transmission over 2480 km of standard fibre without optical dispersion compensation, " ECOC 2006, paper Th2.5.5.
H. Sun, et al, "Real-time measurements of a 40 Gb/s coherent system," Opt. Express 16, 2008, pp. 873-879.

* cited by examiner

*Primary Examiner* — Leslie Pascal
(74) *Attorney, Agent, or Firm* — Roylance, Abrams, Berdo & Goodman, L.L.P.; David L. Soltz

(57) ABSTRACT

Consistent with the present disclosure, a method and system for estimating chromatic dispersion of an optical signal in a coherent receiver is provided that is insensitive to polarization mode dispersion (PMD) and other polarization effects in the optical communication system. The effects of chromatic dispersion in the optical system are estimated by first calculating a phase shift between a pair of related frequency domain data outputs of a Fourier transform circuit. The calculated phase shift includes a linear phase component that is proportional to the chromatic dispersion, a DC constant phase component, and a data spectrum component. The calculated phase shift is then averaged over a number of clock cycles to remove the data spectrum components. The time averaged result is used to normalize any effects of PMD from the received signal. A slope of the linear phase component as a function of frequency is then calculated and used to estimate the value for chromatic dispersion. The chromatic dispersion estimate is then used to determine a number of coefficients of an inverse frequency response of the chromatic dispersion in the system, and is used to compensate for the chromatic dispersion.

18 Claims, 5 Drawing Sheets

PMD-INSENSITIVE METHOD OF
CHROMATIC DISPERSION ESTIMATION
FOR A COHERENT RECEIVER

BACKGROUND OF THE DISCLOSURE

Coherent optical communication systems have been developed that provide distinct advantages over more traditional direct detection schemes. In a coherent optical communication receiver, the optical phase and amplitude of a transmitted optical signal can be detected, thus enabling the use of multilevel modulation schemes to increase optical fiber spectral efficiency. Coherent detection provides another advantage over direct detection in that linear impairments of the transmitted optical signal can be compensated for in the receiver using digital filters and other known digital compensation techniques.

Some important linear impairments that can affect the performance of optical communication systems include two forms of signal distortion resulting from chromatic dispersion (CD) and polarization mode dispersion (PMD) of the optical signal. The transmitted optical signal has a finite spectral width such that the spectral components may be transmitted at different frequencies. Chromatic dispersion is a result of the different spectral components propagating at different speeds along the fiber, resulting in an undesirable temporal spreading of the optical signal. PMD occurs due to the different polarization modes of the optical signal propagating along the fiber at different speeds and is affected by environmental effects and asymmetries in the optical fiber, which are often random, unpredictable and can vary over time. Due to the random and unpredictable nature of PMD, PMD cannot be easily determined or compensated for in a conventional optical communication system.

Optical communication systems generally include a number of links of optical fibers and optical system components, each contributing to the overall chromatic dispersion of received signals. The effects of chromatic dispersion are linear and deterministic and can be more easily compensated for than the effects of PMD. One conventional method of compensating for chromatic dispersion in an optical communication system includes the use of dispersion compensation fibers (DCFs) or other components that compensate chromatic dispersion optically. In practice, however, implementing such DCFs and other known dispersion compensating techniques and components in the optical communication system undesirably increases the size of the system, and can be cumbersome and expensive. Additionally, such dispersion compensation components can undesirably limit the power and spectral efficiency of the optical communication system.

Recent advances in coherent receiver technology allow for compensation of linear transmission impairments, such as chromatic dispersion, by utilizing digital compensation in the receiver instead of performing optical compensation using DCFs, such as those described above. One challenge, however, is that this type of coherent optical receiver should be designed to compensate for a large chromatic dispersion, such as values as high as 51,000 ps/nm. Another challenge is that since the received signal is affected by both chromatic dispersion and PMD, it is more difficult to estimate the effects of either one. In the conventional systems discussed above, the chromatic dispersion is commonly compensated for first, or otherwise considered to be negligible, so that the PMD can be more accurately estimated at the receiver. In a system with potentially large chromatic dispersion and PMD, it is very difficult to accurately and efficiently estimate these effects in the receiver, thus seriously degrading performance of the optical communication system.

Some known methods for dealing with these impairments utilize a preset or adaptive filter to compensate for a known chromatic dispersion in the receiver. These solutions, however, are limited in that in many systems, especially switched systems in which the signal may travel via one of several different links, the chromatic dispersion effects cannot be easily known or determined in advance because each link scenario has a different chromatic dispersion, or the adaptive filter cannot be easily or efficiently updated.

In other known systems, where the chromatic dispersion is unknown, the chromatic dispersion may be estimated by iteratively scanning a range of chromatic dispersion values for the received signal until some control loops in the receiver are working, e.g., automatic gain control (AGC) and clock recovery loop. The scanning is performed by estimating a first value for the chromatic dispersion (such as 1000 ps/nm), calculating a chromatic dispersion coefficient, evaluating a receiver circuit response using the calculated chromatic dispersion coefficients in a compensation filter, then revising the estimate if necessary. The range of the estimated chromatic dispersion values should be relatively narrow to minimize estimation error and ensure that the control loops work, that is, to ensure a clock phase detector has satisfactory sensitivity. For example, the estimated chromatic dispersion value in each step should differ by 1000 ps/nm or less per step. To compensate for a chromatic dispersion of up to 50,000 ps/nm (from the above example), the scan may require approximately 50 steps or iterations. For each iteration, the step of calculating the chromatic dispersion coefficients results in even greater complexity. Additionally, there is added delay in such systems due to the time required for the acquired signal to be allocated for the chromatic dispersion scanning steps discussed above. Another disadvantage of such methods is that the chromatic dispersion cannot accurately be estimated until the clock recovery loop is locked, but the clock recovery loop cannot lock without the chromatic dispersion value first being determined, leading to added delay in acquiring a desired sensitivity of the clock recovery loop. Such methods of scanning for the chromatic dispersion value lead to an undesired increase in processing time and undue complexity in the receiver.

There are known methods that include increasing the efficiency of such scanning methods described above by employing adaptive techniques to reduce the processing time and minimize the chromatic dispersion estimation error. For instance, one known method proposes an adaptive algorithm for determining an equalizer metric in a frequency domain equalizer (FDE) to estimate the chromatic dispersion from the received signal. In another known method, each of the transfer functions for a range of predetermined chromatic dispersion values are determined and pre-stored in a look-up table to reduce complexity at the receiver. These methods, however, are still too inefficient for a receiver when there is large chromatic dispersion in the optical communication system.

Furthermore, for optical communication systems with large PMD, the above receiver techniques do not provide satisfactory sensitivity with respect to the PMD effects, thus resulting in poor system performance. Specifically, the chromatic dispersion estimation methods discussed above fail to discriminate between actual chromatic dispersion effects and the effects of the second and higher order components of PMD present in the optical communication system. Second order PMD is characterized as the derivative of the first order PMD with respect to frequency. Because second order PMD is a function of frequency, it mimics chromatic dispersion. If the estimated chromatic dispersion in these known methods includes the effects of second order PMD, the receiver sensitivity can be seriously corrupted.

There is a need, therefore, for an efficient, yet robust method of estimating the chromatic dispersion of a modulated and polarization-multiplexed signal transmitted over a fiber optic medium that is also insensitive to PMD effects. Thus, it is desirable to implement a method which includes estimating the chromatic dispersion directly from the received signal, without iterative scanning for the chromatic dispersion value, that distinguishes the unfavorable chromatic dispersion effects from those resulting from PMD. It is also desirable to implement a method in which the chromatic dispersion is accurately estimated prior to and/or independent from locking a clock recovery loop in the receiver.

SUMMARY OF THE DISCLOSURE

Consistent with an aspect of the present disclosure, a method for compensating chromatic dispersion in a received optical signal is provided in which a plurality of outputs of a Fourier transform circuit supply frequency domain data in response to time domain data associated with the optical signal. A first parameter is determined based on components of the frequency data supplied from selected ones of the plurality of outputs of the Fourier transform circuit, said first parameter being indicative of a phase difference between selected ones of the plurality of components. A second parameter that is indicative of a chromatic dispersion of the optical signal is determined based on said first parameter. Then, a frequency response of the chromatic dispersion based on said second parameter is determined and said plurality of outputs of the frequency domain representation of the received signal are processed based on the frequency response of the chromatic dispersion.

Consistent with another aspect of the present disclosure, a method of compensating chromatic dispersion of a received optical signal supplies an analog signal in response to the received optical signal. The analog signal is sampled to provide time domain data with an associated baud frequency, which is supplied to a Fourier transform circuit. A number of first parameters are calculated from a plurality of respective subsets of frequency domain data output from the Fourier transform circuit, each of said subsets include a first and second sample of the frequency domain data offset from each other by a value indicative of the baud frequency. The method then determines a linear phase of a time averaged value of each of said respective first parameters over a predetermined time period and calculates a second parameter indicative of a chromatic dispersion of the optical signal based on the linear phase of each of the plurality of said time averaged values, said second parameter being indicative of a linear slope of said plurality of linear phases.

Consistent with another aspect of the present disclosure, a method compensates chromatic dispersion by first estimating a value indicative of a chromatic dispersion of an optical signal based on a subset of a frequency domain data of a received signal. A frequency response of the chromatic dispersion is then determined based on said value and the frequency domain data is multiplied by an inverse of the determined frequency response.

Consistent with another aspect of the present disclosure, a receiver is provided comprising a Fourier transform circuit comprising a plurality of outputs of frequency domain data in response to time domain data associated with a received optical signal. The receiver further comprises a first module configured to determine a first parameter based on components of the frequency data supplied from selected ones of the plurality of outputs of the Fourier transform circuit, said first parameter being indicative of a phase difference between selected ones of the plurality of components. A second module is also provided that is configured to determine a second parameter indicative of a chromatic dispersion of the optical signal based on said first parameter, and to determine a frequency response of the chromatic dispersion based on said second parameter. The receiver further comprises a third module configured to process said plurality of outputs of the frequency domain representation of the received signal based on the frequency response of the chromatic dispersion.

Consistent with another aspect of the present disclosure, a system is provided comprising a receiver configured to receive an optical signal and supply an analog signal in response to the optical signal. The receiver further comprises a first component configured to sample the analog signal to provide time domain data with an associated baud frequency and supply the time domain data to a Fourier transform circuit, and a second component configured to calculate a number of first parameters from a plurality of respective subsets of frequency domain data output from the Fourier transform circuit, each of said subsets including a first and second sample of the frequency domain data offset from each other by a value indicative of the baud frequency. A third component is also provided in the receiver to determine a linear phase of a time averaged value of each of said respective first parameters over a predetermined time period, and calculate a second parameter indicative of a chromatic dispersion of the optical signal based on the linear phase of each of the plurality of said time averaged values, said second parameter being indicative of a linear slope of said plurality of linear phases.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiment(s) and together with the description, serve to explain the principles of the invention.

DETAILED DESCRIPTION OF THE EMBODIMENTS

Consistent with the present disclosure, a method for estimating and compensating chromatic dispersion in a coherent receiver, and an optical communication system using the method, is provided that is insensitive to PMD. A Fourier transform circuit provides, from a plurality of outputs, frequency domain data based on time domain data associated with a received optical signal. A phase difference between each of a number of pairs of related outputs of the frequency domain data is determined by computing the dot product of the related outputs. Each of the related outputs are offset from each other in the frequency domain by a value proportional to a sampling frequency, the outputs being related in that they comprise the same data spectrum. The dot product for each pair of related outputs yields a component of the data spectrum of the related outputs, a linear component of the phase difference between the related outputs, and a DC component of the phase difference. By time-averaging the dot product for each of the number of pairs over a predetermined amount of time, the data spectrum component is reduced to a constant value. An estimate for the chromatic dispersion is then calculated based on a linear slope of the time-averaged dot products.

When applying this method to a dual polarization multiplexed signal, a chromatic dispersion estimate is calculated that is insensitive to PMD and other polarization effects in the optical communication system by determining the determinant of a linear system in which the PMD and polarization effects are represented, for example, using a Jones matrix. Because results in accordance with exemplary embodiments for estimating chromatic dispersion are insensitive to the PMD effects in the system, the calculated chromatic dispersion estimate is effective for compensating for the chromatic dispersion in the receiver, even if the PMD and other polarization effects are large. Additionally, because the chromatic dispersion estimate is calculated directly from the received signal without performing inefficient chromatic dispersion scanning methods, even very large values of chromatic dispersion can be quickly estimated in the optical communication system. Methods and systems consistent with exemplary embodiments also enable a coherent receiver to efficiently detect a clock phase of the received signal together with a value for the chromatic dispersion, thus, increasing the receiver sensitivity and boosting performance of the overall optical communication system.

Reference will now be made in detail to the present exemplary embodiments, which are illustrated in the accompanying drawings. Wherever possible, the same reference numbers will be used throughout the drawings to refer to the same or like parts.

Figure 1:
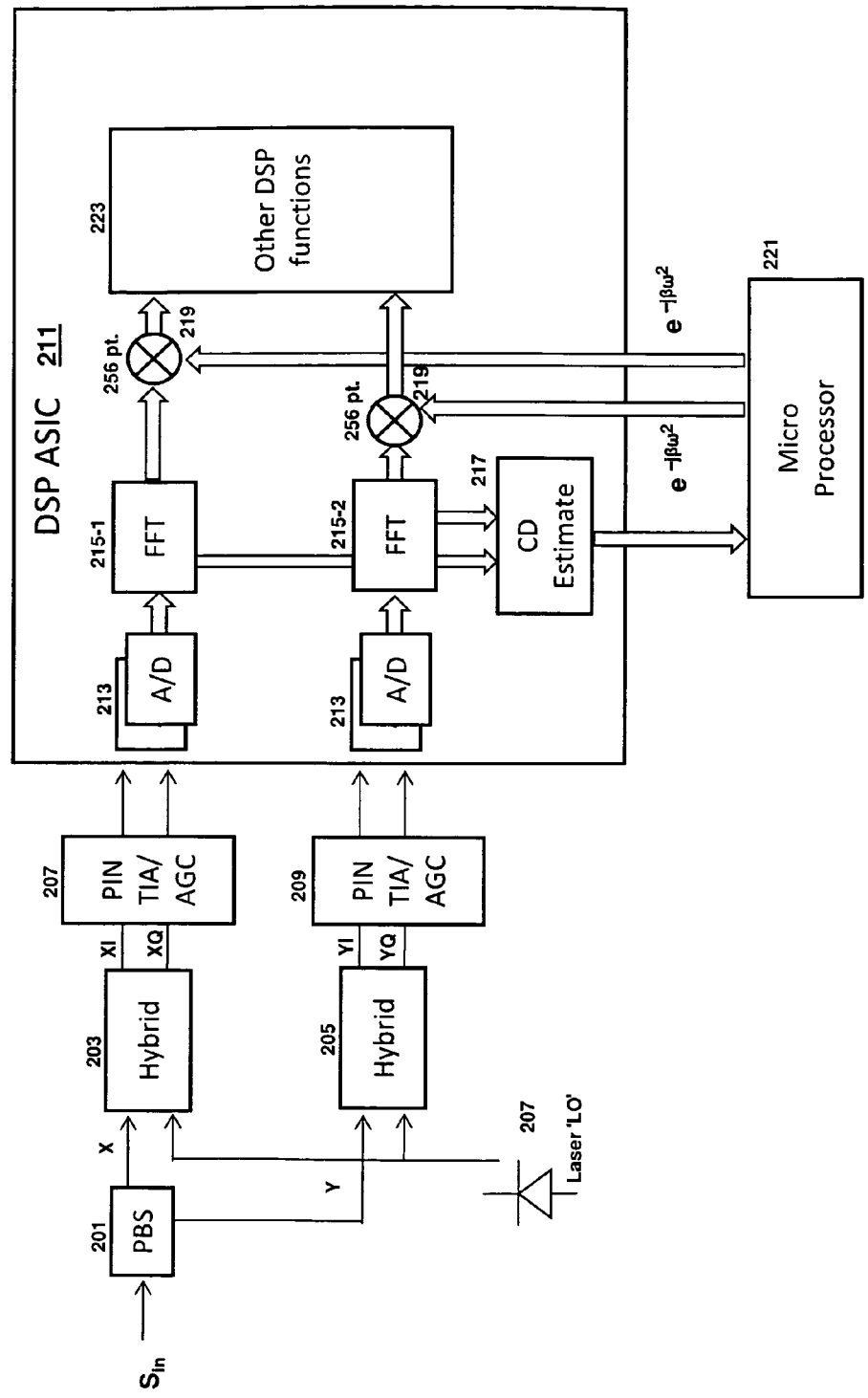
FIG. 1 is a block diagram illustrating a coherent receiver consistent with an aspect of the present disclosure.

FIG. 1 illustrates an embodiment of a coherent receiver 200 consistent with an aspect of the present disclosure. As shown, an incident optical signal $S_{in}$ is separated by a polarization beam splitter (PBS) 201 into first and second polarized signals of X and Y polarity, respectively. The polarized signals may be orthogonally polarized. The X polarity signal and the Y polarity signal are then respectively fed into two optical hybrids 203 and 205 together with a reference signal of a local oscillator optical signal output from a local oscillator laser 207. Each optical hybrid (203, 205) supplies optical signals to detector circuits 206 and 209, each of which include known transimpedance amplifier and automatic gain control circuitry. Each of detector circuits 206, 209 produces two baseband electrical signals linearly proportional to the in-phase (I) and quadrature (Q) components of the optical E-field on the X and Y polarity signals, respectively (i.e. XI, XQ and YI, YQ). XI, XQ and YI, YQ are analog signals which are next fed to analog to digital converters (A/D) circuits 213, which may be within a digital signal processor (DSP) ASIC 211. A/D circuits 213, in turn, output digital or digitized signals, as further shown in FIG. 1.

Because chromatic dispersion in optical communication systems can be represented by a linear function, compensation of chromatic dispersion in a receiver consistent with the disclosed embodiments can be readily implemented using a finite impulse response filter (FIR) in the frequency domain, by determining an inverse frequency response of the chromatic dispersion. Accordingly, chromatic dispersion estimation techniques consistent with exemplary embodiments are performed effectively in the frequency domain where they can be demonstrated to be insensitive to PMD. Thus, according to the disclosed embodiments, a plurality of Fast Fourier Transform (FFT) blocks or circuits 215-1 and 215-2 receive the digitized signals, supplied by A/D circuits 213, which are all in the time domain, and output signals which are in the frequency domain. As shown in FIG. 1, a first FFT block 215-1 is used to transform the X polarity signals and a second FFT block 215-2 is used to transform the Y polarity signals. For example, as depicted in FIG. 1, FFT blocks 215-1 and 215-2 have 256 outputs each, and thus may perform a 256 "point" transformation of the received signals, however, the present disclosure is not limited to this specific design and other methods of transforming the digital signals to the frequency domain could be used consistent with the present disclosure.

To demonstrate that exemplary methods of estimating chromatic dispersion according to the present disclosure are insensitive to PMD, a first embodiment of estimating chromatic dispersion in an optical receiver will be explained with respect to FIG. 2. According to this first exemplary embodiment, a singularly polarized transmitted optical signal is processed in the receiver, as discussed above. A sample 10 Gbaud data spectrum of the singularly polarized transmitted signal is shown in FIG. 2(a). $X_U$ represents the random data spectrum in the upper side band of the X polarized transmitted signal, and $X_L$ represents the random data spectrum in the lower side band of the X polarized signal. To compensate for the chromatic dispersion in the optical communication system through which the polarized optical signal was transmitted, the exemplary method determines a phase difference between related frequency domain data of the received signal as a function of frequency. As discussed further below, the frequency domain data includes related data due to the up-sampling of the received signal, the data being related in that they include the same data spectrum. An illustrative up-sampled signal is shown in FIG. 2(b). In this illustrative example, the 10 Gbaud signal spectrum is up-sampled by twice the baud rate or baud frequency so that it now spans over 20 Gbaud. As a result of the up-sampling of the received signal shown in FIG. 2(a), the data from $X_U$ and $X_L$ is effectively copied as indicated by the dashed arrows in FIG. 2, the copied data being spectrally spaced from one another by a value indicative of the baud frequency. More particularly, in FIG. 2(b), $A_U$ and $A_L$ represent the same data spectrum as $X_U$, and $B_U$ and $B_L$ represent the same data spectrum as $X_L$. While the exemplary embodiments are described herein using a 2 times up-sampling rate (2 samples per symbol), in practice, the exemplary embodiments may be realized using any sampling rate at least equal to or greater than the transmit baud rate, i.e. greater than or equal to 1 sample per symbol.

In this first embodiment, it is assumed that the received signal is free from any PMD or other polarization rotation effects. Additionally, as shown in FIG. 2(b), the received signal may have been modulated using some amplitude function represented by the curve shown. For the purpose of estimating chromatic dispersion in this embodiment, however, the amplitude function is also ignored. Thus, with the above assumptions, the upper and lower side bands of the up-sampled signal may be modeled in the frequency domain using equations 1 and 2 (Eqn. 1, 2), below.

$$A_U(f_1) = X_U(f_1) e^{j\beta\omega_1^2} e^{-j\tau\cdot\omega_1} \quad \text{(Eqn. 1)}$$

$$A_L(f_2) = X_U(f_2) e^{j\beta\omega_2^2} e^{-j\tau\cdot\omega_2} \quad \text{(Eqn. 2)}$$

Where, $X_U(f)$ is the upper-side band (USB) data spectrum of the X polarity signal, $\beta$ is the chromatic dispersion coefficient, and $\tau$ is the clock phase. As discussed above, $A_U$ and $A_L$ comprise the same data, and they differ only by $\omega_1$ and $\omega_2$. In this example, $f_1(=\omega_1/(2\pi))$ is from 0 to 5 GHz, and $f_2(=\omega_2/(2\pi))$ is from −10 to −5 GHz, i.e., $f_2 = f_1 - 10$ GHz. For simplicity, throughout the remainder of this disclosure, each pair of frequencies ($f_1$ and $f_2$) will be represented by the singular value f. Similar representations for $B_U$ and $B_L$, which are copies of the lower side band data spectrum of X, can be written using the expressions shown in Eqn. 1 and Eqn. 2, respectively, by substituting $X_L$ for $X_U$. In this embodiment, however, the exemplary method is demonstrated by modeling only the expression of $A_U$ and $A_L$ as further discussed below.

In the actual implementation at the receiver, data samples are received in "chunks" during each clock cycle. In this example, each data sample is processed by the FFT block 215-1 and corresponding frequency domain data is output. During each clock cycle, data processing by FFT block 215-1 can be modeled using Eqn. 1 and Eqn. 2 above. Because $\beta$ represents the chromatic dispersion coefficient of the received signal, it is this value that the exemplary method determines. Upon determining a value for $\beta$, the effects of chromatic dispersion can be compensated for in the receiver by multiplying the outputs of FFT block 215-1 by the inverse frequency response $e^{-j\beta\omega^2}$, as shown in FIG. 1.

The value for $\beta$ is determined by comparing the phase differences between $\omega^1$ and $\omega^2$ over a desired number of frequencies. This phase difference is determined by calculating the dot product between $A_U$ and the complex conjugate of $A_L$ for each related pair of FFT outputs represented by frequencies (e.g. $f_1$ and $f_2$) as shown in Eqn. 3 below. The resultant vector, however, may appear noisy due to the presence of the random data $X_U(f)$, and $\beta$ cannot easily be determined. It can be shown, however, that $|X_U(f)|^2$ over all frequencies from 0-5 Ghz averages to a value of 1. Due to the random nature of $X_U$, the noisy effects of $|X_U(f)|^2$ can be mitigated by calculating a time average of the dot product for each pair of frequencies over a desired number of clock cycles. For each clock cycle, the values for $\beta$, $\omega_1$ and $\omega_2$ for a selected pair of FFT 215-1 outputs ("frequency bins") remain the same. $X_U$, however, changes between clock cycles in each respective pair of frequency bins. Thus, averaging the dot product for each frequency pair over a predetermined period of time, i.e. over a number of clock cycles, preserves the phase information of the dot product while reducing the $|X_U(f)|^2$ data to a value of 1. The greater the number of clock cycles used in the averaging step, the closer $|X_U(f)|^2$ approaches 1. In this exemplary embodiment, the averaging step is performed for at least 64 clock cycles. The averaging, however, may be performed over any desired number of clock cycles, such as 4, 8, 16, 32, 64 or more, as discussed in greater detail below. The expression for the time average of the dot product for each frequency is shown by the angled brackets < > in Eqn. 3 below.

$$\langle (A_U(f)\cdot A_L^*(f))\rangle = X_U(f)X_U^*(f)\cdot e^{j\beta\omega_1^2} e^{-j\tau\cdot\omega_1} e^{-j\beta\omega_2^2}$$
$$e^{+j\tau\cdot\omega_2} = |X_U(f)|^2 e^{j\beta(\omega_1^2-\omega_2^2)} e^{-j\tau(\omega_1-\omega_2)} \quad \text{(Eqn. 3)}$$

As discussed above, the magnitude of the data spectrum, $|X_U(f)|^2$, over a sufficient number of clock cycles becomes a scalar. Once the noisy effects of the data spectrum are removed, the phase difference of this time averaged quantity is more easily determined and is represented as $\beta(\omega_1^2-\omega_2^2)-\tau(\omega_1-\omega_2)$. In this illustrative example, $\omega_1-\omega_2 = 2\pi\cdot10$ GHz is a constant with respect to $\omega_1$, and $\omega_1^2-\omega_2^2$ is a linear function of $\omega_1$ or f. It follows then that the linear phase component, $\omega_1^2-\omega_2^2$ of the above quantity, is proportional to the chromatic dispersion coefficient $\beta$, and the DC constant portion of the quantity is proportional to the clock phase $\tau$.

From the above expression (Eqn. 3), the chromatic dispersion in the optical communication system may be estimated in accordance with an exemplary embodiment. Since the value for $\beta$ is proportional to the linear function of $\omega_1^2-\omega_2^2$, the value for $\beta$ is determined by calculating the linear slope of the time-averaged dot product in Eqn. 3 with respect to frequency. In other words, the value for $\beta$ can be calculated by determining the rate of change of the calculated phase differences $\omega_1^2-\omega_2^2$ with respect to frequency. For example, in the exemplary embodiment using 256-pt FFT block 215-1, the calculation in Eqn. 3 may be performed over 32 related outputs or frequency bin pairs of the 256 outputs from the FFT block 215-1. The linear phase of the 32 resultant complex values are then graphed with respect to frequency and a linear slope of the graph is calculated. As noted above, this calculated linear slope is proportional to the value of $\beta$. This determined value is then used to calculate the coefficients associated with each frequency bin, which are input to the respective multipliers 219 shown in FIG. 1.

Another exemplary method for determining the value of $\beta$, without graphing the vectors, is shown in Eqn. 4, which provides that the estimate for chromatic dispersion is proportional to the angle of the sum of the differences for each calculation of the dot product from Eqn. 3 times the conjugate of the dot product shifted by $\Delta f$, over all selected frequencies. In this further exemplary embodiment, Eqn. 4 is implemented in the microprocessor 221 shown in FIG. 1. In practice, any method for calculating the linear slope of the dot product in Eqn. 3 with respect to frequency may be used to calculate the value for $\beta$, as would be understood by one of ordinary skill in the art.

$$CD \propto \text{angle}\left\{\sum_{\text{all } f} [A_U(f)\cdot A_L^*(f)]\cdot [A_U(f-\Delta f)\cdot A_L^*(f-\Delta f)]^*\right\} \quad \text{(Eqn. 4)}$$

As discussed above, the time-averaged value of the dot product in Eqn. 3 yields a linear phase component and a DC constant phase component. Since the value for $\beta$ is determined from a slope of the linear phase of the dot product in Eqn. 3, the exemplary method effectively ignores the DC constant phase component, thus, the chromatic dispersion estimate is not sensitive to any static clock phase $\tau$. Recovering the clock phase $\tau$ enables the receiver clock to synchronize or "lock" with the clock of the transmitter of the received signal. Prior to "locking" the clock, however, the receiver clock may be offset from the transmit clock by up to 100 ppm, and in this case the clock phase $\tau$ may not be static. In other words, the 100 ppm difference may result in a statistical variation of the parameter '$\tau$' in the time averaging of the dot product of Eqn. 3 over a number of clock cycles. Therefore in practice, even though the exemplary method is insensitive to a static clock phase, the predetermined time or number of clock cycles used for averaging the dot product should be selected in consideration of the amount of clock offset.

For example, if averaging the dot product of Eqn. 3 for 64 clock cycles, results in a 2 p rotation of the phase in each of the frequency components of Eqn. 3 with a 200 ppm clock offset, then the averaging in Eqn. 3 does not yield any useful information. Therefore, with a 200 ppm clock offset, the number of clock cycles used in the averaging step should be reduced to say 16 or less. In turn, the smaller the amount of clock offset, the greater the number of clock cycles can be used during the time-averaging step. This concept is discussed in greater detail with respect to the second embodiment below.

Figure 3:
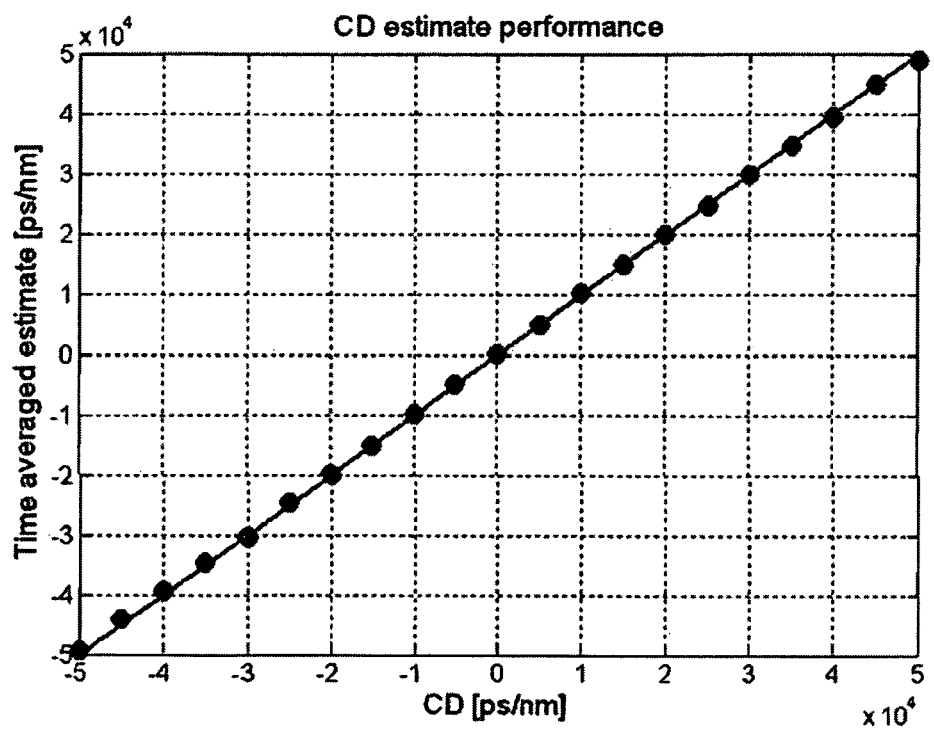
FIG. 3 is a graph depicting the modeled performance of the CD estimate determined with respect to the sample signal illustrated in FIG. 2 consistent with an aspect of the present disclosure.

When a 256-pt FFT is used in a receiver consistent with an exemplary embodiment, the above estimate is satisfactory even if the receiver clock is not locked and there is 100 ppm offset. FIG. 3 depicts the performance of the estimated chromatic dispersion in this embodiment without PMD or other polarization effects with respect to the actual chromatic dispersion for a QPSK modulated system, or any modulation format, considering 10 dB OSNR, 8 MHz LW, 1 GHz frequency offset and 512 clock average. In a 2×(2 times) over-sampled system using a 256 point FFT, each FFT produces an estimate with a variance=2340 ps/nm RMS. As shown in FIG. 3, the estimated chromatic dispersion in this exemplary embodiment is nearly the same as the actual chromatic dispersion itself.

Figure 6:
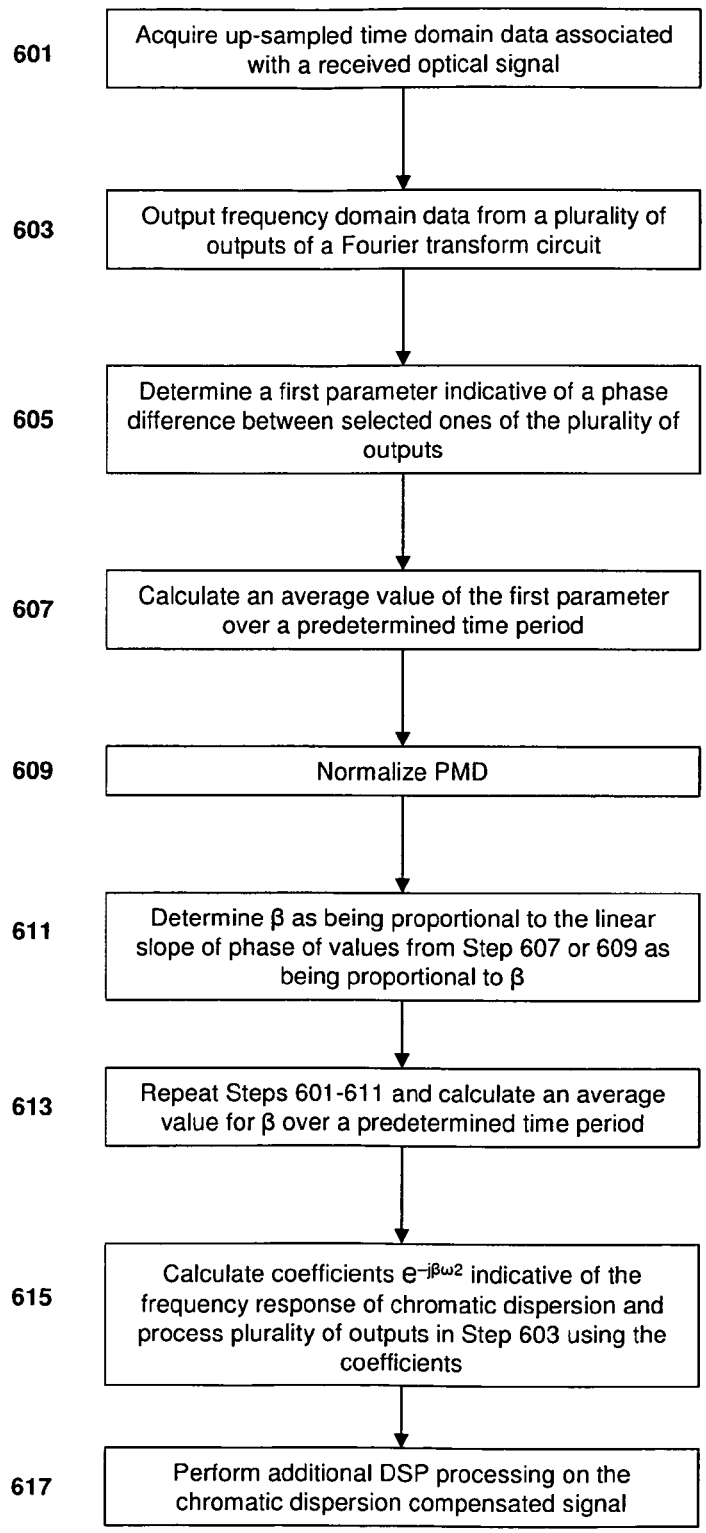
FIG. 6 is a flow diagram illustrating the steps performed in estimating chromatic dispersion consistent with the present disclosure.

The above disclosure provides exemplary embodiments for estimating a value of chromatic dispersion in an optical communication system for a single polarization signal. In the above embodiments, the received signal was modeled without considering the effect from PMD or other polarization rotation effects in the system. The results of the above exemplary embodiments can be extended to develop a chromatic dispersion estimate method that is insensitive to PMD in the optical communication system for a received signal with both X and Y polarizations. The individual steps of the following exemplary method are illustrated in the flow diagram of FIG. 6, and are referred to throughout.

Figure 4:
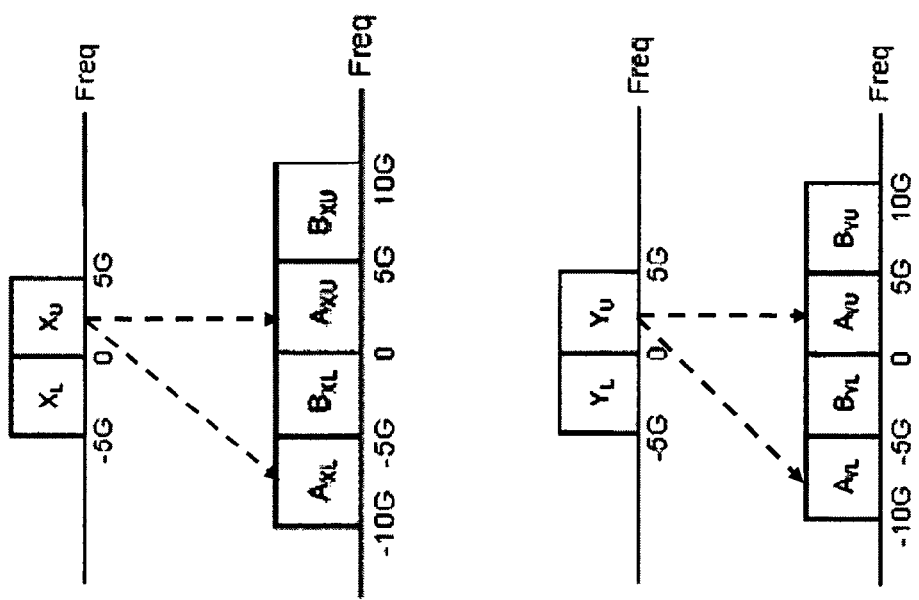
FIG. 4 is a diagram of a sample signal spectrum of a polarization multiplexed signal used to estimate the CD consistent with an aspect of the present disclosure.

With respect to steps 601 and 603, a received signal is detected in the coherent receiver 200, shown in FIG. 1, and is up-sampled by the A/D converters 213. The up-sampled digital signal is transformed into the frequency domain using FFT blocks 215-1 and 215-2, as noted above. FIG. 4 illustrates the data spectra for a two polarization multiplexed signal which is used to expand the above exemplary embodiment that assumes no PMD, to a further exemplary embodiment where PMD effects are not negligible. The received data spectrum, according to this embodiment, includes both X and Y polarization components, which "overlap" as shown in FIG. 4. Similar to the discussion with respect to FIG. 2, the 2×(2 times) up-sampled data spectra for both the X and Y polarization can be represented as shown. Once again, in the 2×up-sampled spectrum, $A_{XU}$ and $A_{XL}$ include the copied data spectrum from $X_U$, and $A_{YU}$ and $A_{YL}$ include the copied data spectrum from $Y_U$, the copied data spectrum being offset by a value indicative of the baud frequency.

To demonstrate that the exemplary embodiment is insensitive to PMD, the received up-sampled signals are modeled including the effects of PMD and any other polarization rotation effects. As would be understood by one of ordinary skill in the art, the polarization rotations of the transmitted signal can be modeled using a Jones matrix as shown in Eqn. 5. Accordingly, as shown in the matrix representation of Eqn. 5 below, for the dual polarized signal, $A_{XU}$ is modeled as a function of $X_U$ and $Y_U$ times the corresponding elements in the Jones matrix, which is used to model the PMD in the optical communication system. In Eqn. 5 below, $\phi$ represents the phase of the received signal and $\theta$ represents the polarization rotations of the received signal. The expanded form of the matrix representation in Eqn. 5 is shown in Eqn. 6 and Eqn. 8, below.

$$\begin{bmatrix} Axu \\ Ayu \end{bmatrix} = \begin{bmatrix} \cos\theta \cdot e^{-j\phi} & -\sin\theta \\ \sin\theta & \cos\theta \cdot e^{+j\phi} \end{bmatrix} \begin{bmatrix} Xu \\ Yu \end{bmatrix} \quad \text{(Eqn. 5)}$$

The above matrix notation can be similarly applied to model the received $A_{XL}$ and $A_{YL}$ signals, which are expressed in expanded form in Eqn. 7 and Eqn. 9, respectively. The expressions for $A_{XL}$ and $A_{YL}$ differ from $A_{XU}$ and $A_{YU}$ only in the subscripts for $\phi$ and $\theta$. This should be evident since $A_{XL}$ contains the same data spectrum as $A_{XU}$, and $A_{YL}$ contains the same data spectrum as $A_{YU}$, except that they are shifted by a frequency proportional to the up-sampling rate represented in FIG. 4. The most general description of PMD is that it causes a different amount of polarization rotation induced on the signal at different frequencies. In Eqns. 6-9 below, the frequency component in the upper side band is rotated by $\phi_1$ and $\theta_1$ and the frequency component in the lower side band is rotated by $\phi_2$ and $\theta_2$. Thus, when considering the effects of PMD and/or other polarization rotation effects in the optical communication system, the upper and lower side bands for each of the X and Y polarized sample signals in the frequency domain can be written as shown below, where [1] indicates the frequency bin index of the FFT blocks, and $\phi_U$ is a shorthand notation representing the expression for $e^{j\beta\omega_1^2}e^{-j\tau\cdot\omega_1}$ similar to Eqn. 1, and $\phi_L$ is a shorthand notation representing the expression for $e^{j\beta\omega_2^2}e^{-j\tau\cdot\omega_2}$ similar to Eqn. 2. Similar to the first exemplary embodiment, the expressions for $B_{XU}$, $B_{XL}$, $B_{YU}$ and $B_{YL}$, which are copies of the lower side band data spectrum of X and Y, respectively, can be written using the expressions shown in Eqns. 6-9, respectively, by substituting $X_L$ for $X_U$, and $Y_L$ for $Y_U$.

$$A_{XU}[1] = (X_U[1] \cos\theta_1 e^{-j\phi_1} - Y_U[1] \sin\theta_1) \cdot e^{j\phi_U} \quad \text{(Eqn. 6)}$$

$$A_{XL}[1] = (X_U[1] \cos\theta_2 e^{-j\phi_2} - Y_U[1] \sin\theta_2) \cdot e^{j\phi_L} \quad \text{(Eqn. 7)}$$

$$A_{YU}[1] = (X_U[1] \sin\theta_1 + Y_U[1] \cos\theta_1 e^{+j\phi_1}) \cdot e^{j\phi_U} \quad \text{(Eqn. 8)}$$

$$A_{YL}[1] = (X_U[1] \sin\theta_2 + Y_U[1] \cos\theta_2 e^{+j\phi_2}) \cdot e^{j\phi_L} \quad \text{(Eqn. 9)}$$

The steps described in the first embodiment, in which PMD effects were ignored, are used to estimate the chromatic dispersion in the present exemplary embodiment. The desired value for estimating the chromatic dispersion in this embodiment, however, is '$\phi_U - \phi_L$'. Specifically, as shown in step 605, the phase difference represented by '$\phi_U - \phi_L$' is preferably detected for each of the desired frequency bins. As can be inferred from the first embodiment, the linear phase of this term is proportional to the chromatic dispersion coefficient $\beta$, and the DC value of this term is proportional to the clock phase $\tau$. As an illustrative example, in this embodiment the upper side band ($A_{XU}$, $A_{YU}$) and lower side band ($A_{XL}$, $A_{YL}$) differ by 10 GHz, as shown in FIG. 4, and thus, for large PMD, any polarization rotations are different across the 10

GHz band. The expressions '$\theta_1, \phi_1$' and '$\theta_2, \phi_2$' are used to model the polarization effects in the optical communication system according to the Jones matrix. Each frequency bin of an exemplary 256-pt FFT has different values for $\phi$ and $\theta$, but as demonstrated below, these values are normalized out of the equations.

To solve for the desired value '$\phi_U-\phi_L$', the above signals are multiplied using a dot product similar to that shown with respect to Eqn. 3 of the previous embodiment. Using Eqns. 6-9, there are four (4) dot product calculations that are performed that result in the desired term '$\phi_U-\phi_L$'. For example, the dot product of $A_{XU}$ and the complex conjugate of $A_{XL}$ results in the desired term '$\phi_U-\phi_L$'. The resultant vector of this dot product contains a component of $|X_U(f)|^2$, $|Y_U(f)|^2$, and $X_U(f) \cdot Y_U^*(f)$, each of which may appear very noisy. As discussed with respect to the previous embodiment, and shown in step 607, by time averaging these resultant vectors over a desired number of clock cycles, the above components of the data spectra are normalized out of the system. For instance, by utilizing a sufficient number of clock cycles, the components for $|X_U(f)|^2$ and $|Y_U(f)|^2$ approach a value of 1. In the exemplary embodiment, 64 clock cycles are used in the averaging step.

Further, the value for $X_U(f) \cdot Y_U^*(f)$ estimates to zero (0), since these signals are orthogonal to each other and do not correlate. Accordingly, no phase information is preserved for these components and the polarization representations of these components can be disregarded. The time averaged dot product for $A_{XU}$ and the complex conjugate of $A_{XL}$ for each frequency bin is represented in the simplified expression of Eqn. 10. Similar steps to those described above are performed to calculate the time averaged dot product $A_{YU}$ and the complex conjugate of $A_{YL}$, which results in the simplified expression of Eqn. 11. The other two dot products that provide the desired term '$\phi_U-\phi_L$' are simplified in Eqns. 12 and 13.

$$\langle A_{XU} \cdot A_{XL}^* \rangle (\cos\theta_1 \cos\theta_2 e^{j(\phi_2-\phi_1)} + \sin\theta_1 \sin\theta_2) \cdot e^{j(\phi_U-\phi_L)} \quad \text{(Eqn. 10)}$$

$$\langle A_{YU} \cdot A_{YL}^* \rangle (\cos\theta_1 \cos\theta_2 e^{j(\phi_2-\phi_1)} + \sin\theta_1 \sin\theta_2) \cdot e^{j(\phi_U-\phi_L)} \quad \text{(Eqn. 11)}$$

$$\langle A_{XU} \cdot A_{YL}^* \rangle (\cos\theta_1 \sin\theta_2 e^{-j\phi_1} + \sin\theta_1 \cos\theta_2 e^{-j\phi_2}) \cdot e^{j(\phi_U-\phi_L)} \quad \text{(Eqn. 12)}$$

$$\langle A_{YU} \cdot A_{XL}^* \rangle (\sin\theta_1 \cos\theta_2 e^{j\phi_2} - \cos\theta_1 \sin\theta_2 e^{j\phi_1}) \cdot e^{j(\phi_U-\phi_L)} \quad \text{(Eqn. 13)}$$

Figure 2:
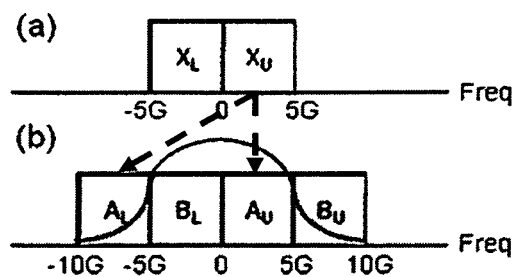
FIG. 2 is a diagram of a sample signal spectrum used to demonstrate the concept of CD estimation consistent with an aspect of the present disclosure.

Similar to the example signal in FIG. 2, and as discussed above, the data spectra for $X_u$ and $Y_u$ are averaged out over time and may be disregarded here. From Eqns. 10-13, the desired value '$\phi_U-\phi_L$' may be difficult to solve due to the presence of the PMD effects modeled by the terms '$\theta_1, \phi_1$' and '$\theta_2, \phi_2$'. The above equations however, represent a linear system, the solution of which can be determined by calculating the determinant of a 2×2 matrix representing the polarization rotations in the linear system of Eqns. 10-13. As would be understood by one of ordinary skill in the art, the determinant of a 2×2 matrix is calculated by multiplying the first diagonal components and subtracting from this value the product of the second diagonal components. Eqn. 14 represents the result of multiplying the first diagonal components of a matrix representing the linear system together and Eqn. 15 represents the result of multiplying the second diagonal components together. Eqn. 16 represents the result of subtracting Eqn. 15 from Eqn. 14, and represents the determinant of the matrix representing the linear system above.

$$\langle A_{XU} \cdot A_{XL}^* \rangle \cdot \langle A_{YU} \cdot A_{YL}^* \rangle = (\cos\theta_1 \cos\theta_2 e^{j(\phi_2-\phi_1)} + \sin\theta_1 \sin\theta_2) \cdot$$
$$(\cos\theta_1 \cos\theta_2 e^{j(\phi_1-\phi_2)} + \sin\theta_1 \sin\theta_2) \cdot$$
$$e^{j2(\phi_U-\phi_L)}$$
$$= (\cos^2\theta_1 \cos^2\theta_2 + \sin^2\theta_1 \sin^2\theta_2 +$$
$$\sin\theta_1 \sin\theta_2 \cos\theta_1 \cos\theta_2 (e^{j(\phi_1-\phi_2)} +$$
$$e^{j(\phi_2-\phi_1)})) \cdot e^{j2(\phi_U-\phi_L)} \quad \text{(Eqn. 14)}$$

$$\langle A_{XU} \cdot A_{YL}^* \rangle \cdot \langle A_{YU} \cdot A_{XL}^* \rangle = (\cos\theta_1 \sin\theta_2 e^{-j\phi_1} - \sin\theta_1 \cos\theta_2 e^{-j\phi_2}) \cdot$$
$$(\sin\theta_1 \cos\theta_2 e^{j\phi_2} - \cos\theta_1 \sin\theta_2 e^{j\phi_1}) \cdot$$
$$e^{2j(\phi_U-\phi_L)}$$
$$= (\sin\theta_1 \sin\theta_2 \cos\theta_1 \cos\theta_2 (e^{j(\phi_2-\phi_1)} +$$
$$e^{j(\phi_1-\phi_2)}) - \sin^2\theta_1 \cos^2\theta_2 -$$
$$\sin^2\theta_2 \cos^2\theta_1) \cdot e^{2j(\phi_U-\phi_L)} \quad \text{(Eqn. 15)}$$

$$\langle A_{XU} \cdot A_{XL}^* \rangle \cdot \langle A_{YU} \cdot A_{YL}^* \rangle -$$
$$\langle A_{XU} \cdot A_{YL}^* \rangle \cdot \langle A_{YU} \cdot A_{XL}^* \rangle = (\cos^2\theta_1 \cos^2\theta_2 + \sin^2\theta_1 \sin^2\theta_2 +$$
$$\sin^2\theta_1 \cos^2\theta_2 + \sin^2\theta_2 \cos^2\theta_1) \cdot$$
$$e^{2j(\phi_U-\phi_L)}$$
$$= (\cos^2\theta_1 + \sin^2\theta_1)(\cos^2\theta_2 + \sin^2\theta_2) \cdot$$
$$e^{2j(\phi_U-\phi_L)}$$
$$= 1 \cdot e^{2j(\phi_U-\phi_L)} \quad \text{(Eqn. 16)}$$

With respect to step 609, and as shown in the simplified expression of Eqn. 16, by calculating the determinant function of the modeled system, the PMD effects, i.e., those represented by '$\theta_1, \phi_1$' and '$\theta_2, \phi_2$' are normalized out of the system. The resultant value provides the expression for determining the value for the chromatic dispersion in the optical communication system.

This above result follows from the known properties of a Jones matrix. For instance, Eqn. 17, demonstrates that the determinant of a Jones matrix is consistent with the above result.

$$\det\left\{\begin{bmatrix} \cos\theta \cdot e^{-j\phi} & -\sin\theta \\ \sin\theta & \cos\theta \cdot e^{+j\phi} \end{bmatrix} e^{j\alpha}\right\} = e^{2j\alpha} \quad \text{(Eqn. 17)}$$

The above property of a Jones matrix shown in Eqn. 17, which is used to accurately model the effects of PMD in this exemplary embodiment, enables the exemplary method to demonstrate that the estimate for the chromatic dispersion in the optical communication system is insensitive to any PMD effects. From the result in Eqn. 16, the modeled linear phase difference is twice the linear phase difference used for the estimate of $\beta$ in the first embodiment. Thus, using the result from Eqn. 16, the chromatic dispersion in a dual polarization multiplexed signal can be estimated as similarly discussed with respect to the first embodiment.

For instance, a time averaged value of each of the dot products in Eqns. 10-12, over a desired number of clock cycles, represented as $\langle A_{XU} \cdot A_{XL}^* \rangle$, $\langle A_{YU} \cdot A_{YL}^* \rangle$, $\langle A_{XU}\cdot A_{YL}{}^*\rangle$, and $\langle A_{YU}\cdot A_{XL}{}^*\rangle$ can be collected for a desired number of frequency components of the transformed received signal. The expression below (Eqn. 18) for $\lambda(f)$ reflects this quantity for the determined phase difference with respect to frequency. The same expression can be generated for $B_{XU}$, $B_{XL}$, $B_{YU}$ and $B_{YL}$ using the above steps.

$$\lambda(f) = \langle A_{XU}\cdot A_{XL}{}^*\rangle \cdot \langle A_{YU}\cdot A_{YL}{}^*\rangle - \langle A_{XU}\cdot A_{YL}{}^*\rangle \cdot \langle A_{YU}\cdot A_{XL}{}^*\rangle \quad \text{(Eqn. 18)}$$

Using the result from Eqn. 16, and representing $e^{j\beta(\omega_1{}^2 - \omega_2{}^2)}$ $e^{-j\tau\cdot(\omega_1 - \omega_2)}$ by $e^{j(\Phi_U - \Phi_L)}$, it can be shown that the linear phase component of $\lambda(f)$ is proportional to the chromatic dispersion coefficient $\beta$, and the DC constant portion of $\lambda(f)$ is proportional to the clock phase $\tau$. From the result in Eqn. 16, the phase detected for $\lambda(f)$ is multiplied by a factor of 2, thus, the following expression (Eqn. 19) can be written for the detected phase of $\lambda(t)$:

$$2\beta(\omega_1{}^2 - \omega_2{}^2) + 2\tau(\omega_1 - \omega_2) \propto \angle\lambda(f) \quad \text{(Eqn. 19)}$$

As similarly described with respect to the first embodiment, the angle of $\lambda(f)$ is calculated by determining the rate of change of the phase difference of $\lambda(f)$ with respect to frequency $(\omega_1{}^2 - \omega_2{}^2)$. According to one exemplary embodiment, which uses 256-pt FFT blocks 215 as shown in FIG. 1, 32 frequency bins may be selected for each of the upper and lower side bands of the X and Y polarized signals. Thus, in this exemplary embodiment, 32 pairs of bins are used to arrive at 32 complex values represented by $\lambda(f)$ defined in Eqn. 18. The phase of the complex values may then be graphed as a function of frequency to calculate the linear slope. As shown in Eqn. 19, the calculated linear slope is proportional to the value for $\beta$ by a factor of 2. Thus, to estimate the value of $\beta$, the calculated slope is divided by 2.

A mathematical expression used in an exemplary embodiment for determining the linear slope of phase of $\lambda(f)$ with respect to frequency as described in step 611, is provided below in Eqn. 20. Similar to Eqn. 4 discussed above, Eqn. 20 provides that the estimate for chromatic dispersion is proportional to the angle of the sum of the differences of $\lambda(f)$ times the conjugate of $\lambda(t)$ shifted by $\Delta f$, for frequencies from $f=0$ to $f_{samp}/2$, where $f_{samp}$ is the sampling frequency. In an exemplary embodiment, Eqn. 20 is implemented in the microprocessor 221 shown in FIG. 1. In practice, however, any method for calculating the linear slope of phase of $\lambda(f)$ with respect to frequency $\omega_1{}^2 - \omega_2{}^2$ may be used to calculate the value for $\beta$, as would be understood by one of ordinary skill in the art.

$$\beta \propto \text{angle}\left[\sum_{f=0}^{f_{samp}/2} \lambda(f)\lambda^*(f - \Delta f)\right] \quad \text{(Eqn. 20)}$$

Using Eqn. 20, the calculation for determining the coefficients to compensate for the chromatic dispersion in the optical communication system is straightforward and depends on the actual implementation. With respect to step 615, using the value for $\beta$, the coefficient for each frequency sample is represented by the inverse frequency response $e^{-j\beta\omega^2}$ of the chromatic dispersion and can be calculated for each sampled frequency of the 256 outputs from FFT blocks 215-1 and 215-2. These coefficients are input to the multipliers 219 shown in FIG. 1.

Figure 5:
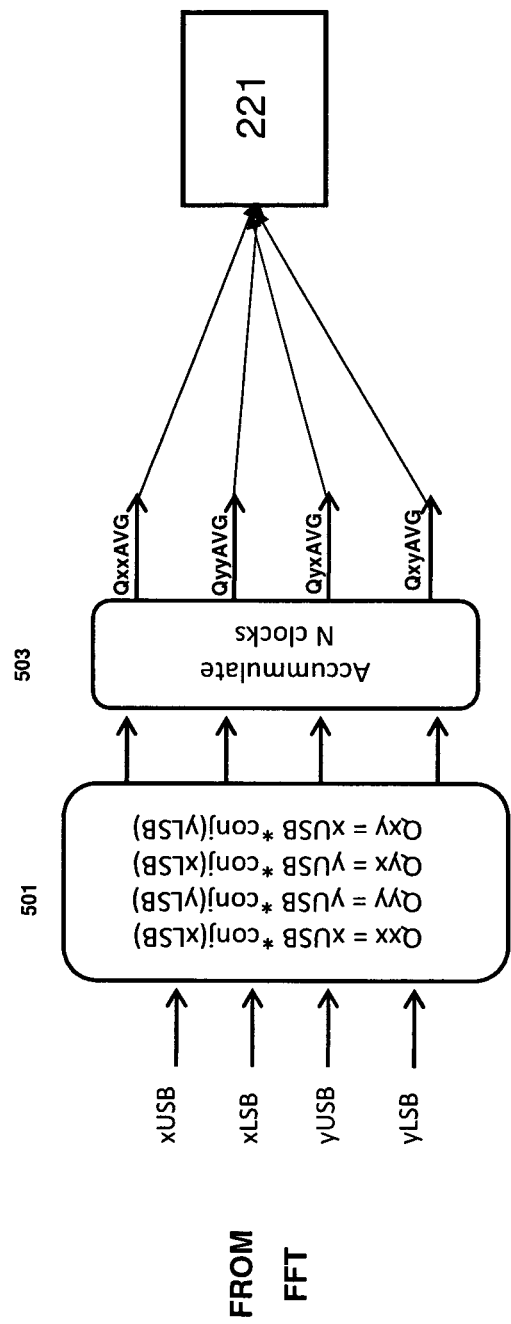
FIG. 5 is a block diagram of the CD estimation circuit consistent with an aspect of the present disclosure.

In the receiver 200 shown in FIG. 1, the chromatic dispersion estimate block 217 is preferably configured entirely in hardware within the DSP ASIC 211 in order to perform the desired functionality in the required amount of time. FIG. 5 depicts a block diagram of the functionality of the chromatic dispersion estimate block 217 shown in FIG. 1. In this exemplary embodiment, the FFT blocks 215-1 and 215-2 output 256 frequency domain data samples of the received signal for each clock cycle in the receiver. For each clock cycle, 32 upper-side band (USB) bins and 32 lower-side band (LSB) bins for each of the X and Y polarized signals are used to perform the chromatic dispersion estimate. A circuit represented by block 501 calculates the dot products represented in Eqns. 10-13, for each frequency bin, denoted by $Q_{xx}$, $Q_{yy}$, $Q_{yx}$, and $Q_{xy}$.

As shown in FIG. 5, a second block 503 calculates the average of each of these values over a desired number of clock cycles. Block 503 is programmable to compute the average values over a desired number of clock cycles such as 4, 8, 16, 32 or 64, or more depending on the embodiment. As discussed above with respect to the first embodiment, the number of clock cycles used to compute the average should be chosen so that the channel of the received signal is relatively static within the predetermined averaging time—this includes clock phase stability and polarization variations. PMD in the optical communication system may change over time, that is, the polarization of the received optical signals may rotate. These polarization variations occur on the order of microseconds, thus it is desirable to calculate the time average in less than a microsecond. Variations in the clock phase, however, can occur much faster, thus additional consideration is taken to ensure the averaging occurs over a duration in which the clock phase also appears static.

As previously discussed, the exemplary method of estimating chromatic dispersion is insensitive to a static clock phase. However, as discussed below, one of the advantages of the exemplary method is that chromatic dispersion can be estimated prior to "locking" the clock in the receiver. In some optical communication systems, however, without "locking" the clock there may be a large offset between the receiver clock and the transmit clock. Most practical crystal oscillators (clocks) used in the transmitters and receivers in conventional optical systems can maintain an unlocked frequency offset less than 100 ppm. Thus, as an example, at a clock offset of 100 ppm, and using a 256 pt FFT (which corresponds to 64 output data symbol pairs), the exemplary method may require on the order of 16 clock cycles for averaging. For instance, in each clock cycle, 64 symbol calculations are executed, for a duration of 16 clocks. With a clock offset of 100 ppm, the exemplary method yields an average clock phase shift of 0.1 symbol intervals (or 0.1 UI) over the 16 clock cycles. An average clock phase shift 0.1 UI in the averaging step will still provide a reliable result in most embodiments. Alternatively, if clock is already locked, then the averaging can be performed over a longer period of time.

As fewer clock cycles are used in the averaging step, the estimated value for chromatic dispersion will yield a less accurate result. Since the averaging step in the DSP ASIC 221 must occur relatively fast, further averaging of the chromatic dispersion is provided in the microprocessor 221. As further shown in FIGS. 1 and 5, in an exemplary embodiment consistent with the disclosure, the averaged values $Q_{xxAVG}$, $Q_{yyAVG}$, $Q_{yxAVG}$, and $Q_{xyAVG}$ are read by microprocessor 221 and provided externally to the DSP ASIC 211. The microprocessor 221 preferably comprises software to calculate the values for $\beta$ using Eqns. 18-20, as discussed above.

In an exemplary embodiment described with respect to step 613, the value for $\beta$ is further averaged in the microprocessor 221 over a desired number of determined values for $\beta$. For example, after every predetermined number clock cycles used in the averaging step, in consideration of the above, a new value for β is calculated. In one embodiment, microprocessor 221 determines 50 successive values of β and determines an average value for β that is used to calculate the coefficients input at multipliers 219 for chromatic dispersion compensation. Since the value for chromatic dispersion changes relatively slowly in an optical communications system, it is reasonable to average the value of β over an extended period. The number of values of β used to calculate the average β will depend on a number of design choices. For instance, the exemplary embodiment only uses 32 pairs of the 256 frequency bins to calculate the estimate for β. While an exemplary embodiment uses only 32 pairs of bins, an exemplary receiver may be configured to use any desired number of frequency bins to estimate the chromatic dispersion. The greater the number of frequency bin pairs utilized, the more accurate the value for β will be for each estimate. Since the value for β in the exemplary embodiment is further averaged over time in microprocessor 21, in an exemplary embodiment, it is sufficient to use only 32 pairs of the bins to estimate a single value for β. As further discussed below, the exemplary embodiment utilizes 32 select frequency bin pairs in consideration of the requirements of an exemplary clock recovery circuit.

The microprocessor 221 then provides the calculated coefficients for β to the multipliers 219. The output of multipliers 219 are then supplied to the function block 223 which performs a number of other DSP functions on the chromatic dispersion compensated signal, as shown in step 617. Some of the other exemplary DSP functions performed in block 223 are described in a paper contributed in part by the Applicants, the entire contents of which are incorporated herein by reference, titled Performance of Dual-Polarization QPSK for Optical Transport Systems, published in the *Journal of Lightwave Technology*, Vol. 27, No. 16, Aug. 15, 2009.

With respect to FIGS. 1 and 5, it should be evident to one skilled in the art that any of the above-described hardware devices may be implemented as one or more software modules in order to perform the operations of the above-described embodiments. For instance, while the FFT circuits 215-1 and 215-2 are shown comprised in the DSP ASIC 211, these circuits may be realized in software alone, or a combination of software and hardware. Additionally, any of the described software components may also be realized in one or more hardware components for performing the desired functionality.

The advantages of the above exemplary embodiments should be evident to one of ordinary skill in the art. Under various simulation conditions, the exemplary embodiments have demonstrated the ability to estimate the coefficients for compensating chromatic dispersion as large as 50,000 ps/nm in less than 1 second. In order to accurately compensate for such large values of chromatic dispersion and large PMD, previously known scanning methods requiring up to 50 scanning steps have been shown to require up to 1 minute to estimate the chromatic dispersion. In some of the known methods, a two-dimensional scan is performed to estimate chromatic dispersion and one other parameter, such as a laser frequency, and may necessitate up to 2500 steps, which could take several minutes. Further, as increasingly larger baud rates (>28 Gbaud) are implemented in optical communication systems in the future, the scanned steps will need to be even finer, such as every 200 ps/nm, thus requiring even more steps and leading to increased delay. The exemplary methods according to this disclosure provide a distinct advantage over known systems and scanning techniques by significantly reducing the time necessary to estimate chromatic dispersion in the optical communication system. Further, since the exemplary embodiments estimate chromatic dispersion directly from the received signal, there is no limit to the amount of chromatic dispersion that can be estimated and compensated for in accordance with the exemplary methods.

Another distinct advantage of the exemplary embodiments can be seen with respect to Eqn. 19 above. Namely, as discussed with respect to Eqn. 19, the DC constant portion of $\lambda(f)$ is proportional to the clock phase $\tau$. The exemplary methods determine the value for the clock phase $\tau$ and the chromatic dispersion coefficient β simultaneously in the same calculation, thus it is not necessary to lock the clock recovery loop to determine the chromatic dispersion value, nor is it necessary to determine the chromatic dispersion value before locking the clock recovery loop. The value for clock phase $\tau$ is used to then accurately lock a clock recovery circuit in the receiver. It has been determined that an exemplary clock recovery circuit achieves satisfactory sensitivity using 32 frequency bin pairs, particularly those centered around $f_{baud}/2$, i.e. bin indices [64] and [192]. To simplify the DSP hardware architecture, these same frequency bin pairs are used to determine the estimate for chromatic dispersion using the exemplary method. As discussed in the background of this disclosure, prior art methods cannot accurately determine the chromatic dispersion value without locking the clock recovery circuit first. Thus, the exemplary methods provide a clear advantage over prior art methods.

Other embodiments will be apparent to those skilled in the art from consideration of the specification. It is intended that the specification and examples be considered as exemplary only, with a true scope and spirit of the invention being indicated by the following claims.

What is claimed is:
1. A method comprising the steps of:
receiving an optical signal;
supplying, from a plurality of outputs of a Fourier transform circuit, frequency domain data in response to time domain data associated with the optical signal;
determining a first parameter based on components of the frequency domain data supplied from selected ones of the plurality of outputs of the Fourier transform circuit, said first parameter being indicative of a phase difference between selected ones of the plurality of components;
determining a second parameter indicative of a chromatic dispersion of the optical signal based on said first parameter;
determining a frequency response of the chromatic dispersion based on said second parameter; and
processing said plurality of outputs of the frequency domain representation of the received signal based on the frequency response of the chromatic dispersion,
wherein the time domain data has an associated baud frequency, and selected ones of the plurality of outputs of the Fourier transform circuit are associated with components of the frequency domain data that are spectrally spaced from one another by the baud frequency, the method further comprises:
calculating an average value of the first parameter over a predetermined time period.
2. A method in accordance with claim 1, further comprising:
generating an analog signal in response to the optical signal;
sampling the analog signal at a sampling frequency; and
providing the time domain data in response to said sampling the analog signal.

3. The method of claim 1, wherein the first parameter corresponds to a dot product of the first and second ones of the plurality of components of the frequency domain data.

4. The method of claim 1, wherein the step of determining the second parameter further comprises:
determining a linear phase of said first parameter, said linear phase being proportional to said second parameter.

5. The method of claim 1, wherein the step of determining a frequency response of the chromatic dispersion further comprises:
calculating a coefficient for each of the plurality of outputs using said second parameter, said coefficients representing a frequency response of the chromatic dispersion.

6. The method of claim 5, wherein the coefficients are calculated using an averaged value of said second parameter based on a predetermined number of values of the second parameter determined over a predetermined period of time.

7. The method of claim 1, wherein the processing step further comprises:
multiplying said plurality of outputs by an inverse frequency response based on a respective coefficient calculated for each of the plurality of outputs.

8. A method comprising the steps of:
receiving an optical signal;
supplying an analog signal in response to the optical signal;
sampling the analog signal to provide time domain data with an associated baud frequency;
supplying the time domain data to a Fourier transform circuit;
calculating a number of first parameters from a plurality of respective subsets of frequency domain data output from the Fourier transform circuit, each of said subsets including a first and second sample of the frequency domain data offset from each other by a value indicative of the baud frequency;
determining a linear phase of a time averaged value of each of said respective first parameters over a predetermined time period; and
calculating a second parameter indicative of a chromatic dispersion of the optical signal based on the linear phase of each of the plurality of said time averaged values, said second parameter being indicative of a linear slope of said plurality of linear phases.

9. The method of claim 8, wherein the first parameters correspond to a dot product of the first and second sample of the frequency domain data.

10. The method of claim 8, further comprising:
determining a frequency response of the chromatic dispersion based on said second parameter; and
processing said plurality of outputs of the frequency domain representation of the received signal based on the frequency response of the chromatic dispersion.

11. The method of claim 10, wherein the step of determining a frequency response of the chromatic dispersion further comprises:
calculating a coefficient for each of the plurality of outputs using said second parameter, said coefficients representing a frequency response of the chromatic dispersion.

12. The method of claim 11, wherein the coefficients are calculated using an averaged value of said second parameter based on a predetermined number of values of the second parameter determined over a predetermined period of time.

13. The method of claim 12, wherein the processing step further comprises:
multiplying said plurality of outputs by an inverse frequency response based on a respective coefficient calculated for each of the plurality of outputs.

14. A receiver comprising:
a Fourier transform circuit comprising a plurality of outputs of frequency domain data in response to time domain data associated with a received optical signal;
a first module configured to determine a first parameter based on components of the frequency data supplied from selected ones of the plurality of outputs of the Fourier transform circuit, said first parameter being indicative of a phase difference between selected ones of the plurality of components;
a second module configured to determine a second parameter indicative of a chromatic dispersion of the optical signal based on said first parameter, and to determine a frequency response of the chromatic dispersion based on said second parameter;
a third module configured to process said plurality of outputs of the frequency domain representation of the received signal based on the frequency response of the chromatic dispersion,
wherein the first module is configured to calculate an average value of the first parameter over a predetermined time period, wherein the first parameter corresponds to a dot product of the first and second ones of the plurality of components of the frequency domain data, and the selected ones of the plurality of outputs of the Fourier transform circuit are associated with components of the frequency domain data that are spectrally spaced from one another by a baud frequency associated with the time domain data.

15. The receiver of claim 14, further configured to:
generate an analog signal in response to the optical signal;
sample the analog signal at a sampling frequency; and
provide the time domain data in response to said sampling the analog signal.

16. The receiver of claim 14, wherein the second module is configured to determine the second parameter by determining a linear phase of said first parameter, said linear phase being proportional to said second parameter, and to determine the frequency response of the chromatic dispersion by calculating a coefficient for each of the plurality of outputs using said second parameter, said coefficients representing a frequency response of the chromatic dispersion, wherein the coefficients are calculated using an averaged value of said second parameter based on a predetermined number of values of the second parameter determined over a predetermined period of time.

17. The receiver of claim 14, wherein the third module comprises a plurality of multipliers configured to multiply said plurality of outputs by an inverse frequency response based on a respective coefficient calculated for each of the plurality of outputs.

18. A system comprising:
a receiver configured to receive an optical signal and supply an analog signal in response to the optical signal, the receiver further comprising:
a first component configured to sample the analog signal to provide time domain data with an associated baud frequency and supply the time domain data to a Fourier transform circuit;
a second component configured to calculate a number of first parameters from a plurality of respective subsets of frequency domain data output from the Fourier transform circuit, each of said subsets including a first and second sample of the frequency domain data offset from each other by a value indicative of the baud frequency; and a third component configured to determine a linear phase of a time averaged value of each of said respective first parameters over a predetermined time period, and calculate a second parameter indicative of a chromatic dispersion of the optical signal based on the linear phase of each of the plurality of said time averaged values, said second parameter being indicative of a linear slope of said plurality of linear phases.

* * * * *